(12) United States Patent
Cui et al.

(10) Patent No.: US 11,130,238 B2
(45) Date of Patent: Sep. 28, 2021

(54) MOBILE CONTROL METHOD, MOBILE ROBOT AND COMPUTER STORAGE MEDIUM

(71) Applicants: ANKOBOT (SHENZHEN) SMART TECHNOLOGIES CO., LTD., Guangdong (CN); ANKOBOT (SHANGHAI) SMART TECHNOLOGIES CO., LTD., Shanghai (CN)

(72) Inventors: Yuwei Cui, Shanghai (CN); Chongxing Li, Shanghai (CN); Zijing Wang, Shanghai (CN)

(73) Assignees: ANKOBOT (SHENZHEN) SMART TECHNOLOGIES CO., LTD., Shanghai (CN); ANKOBOT (SHANGHAI) SMART TECHNOLOGIES CO., LTD., Shanghai (CN)

(*) Notice: Subject to any disclaimer, the term of this patent is extended or adjusted under 35 U.S.C. 154(b) by 0 days.

(21) Appl. No.: 17/114,677

(22) Filed: Dec. 8, 2020

(65) Prior Publication Data

US 2021/0138657 A1    May 13, 2021

Related U.S. Application Data

(63) Continuation of application No. PCT/CN2018/090501, filed on Jun. 8, 2018.

(51) Int. Cl.
*B25J 9/16*     (2006.01)
*B25J 11/00*    (2006.01)
*B25J 13/08*    (2006.01)

(52) U.S. Cl.
CPC .......... *B25J 9/1697* (2013.01); *B25J 9/161* (2013.01); *B25J 9/1653* (2013.01); *B25J 9/1666* (2013.01); *B25J 11/0085* (2013.01); *B25J 13/089* (2013.01)

(58) Field of Classification Search
CPC ...... B25J 9/1697; B25J 9/1653; B25J 13/089; B25J 11/0085; B25J 9/1666; B25J 9/161
See application file for complete search history.

(56) References Cited

U.S. PATENT DOCUMENTS

2016/0101524 A1    4/2016   Noh et al.
2017/0206418 A1    7/2017   Schnittman
2020/0331148 A1*  10/2020   Zhang ................. B25J 13/089

FOREIGN PATENT DOCUMENTS

CN    105094127 A    11/2015
CN     06338289 A     1/2017
(Continued)

OTHER PUBLICATIONS

Li Qiang, Research On Monocular Vision-Based Realtime Distance Measurement Algorithm, Dec. 2014, Shenzhen Graduate School (Year: 2014).*

(Continued)

*Primary Examiner* — Basil T. Jos
(74) *Attorney, Agent, or Firm* — Leber IP Law; David C. Robertson

(57) ABSTRACT

The present application provides a method for controlling a movement of a mobile robot, a mobile robot and a computer storage medium. The method for controlling a movement of a mobile robot, the mobile robot is provided with an image acquisition device, and the method comprises the following steps: identifying a border line between a first obstacle and a ground from an image captured by the image acquisition device; determining a first relative position between a physical position corresponding to the border line and the mobile (Continued)

robot based on preset physical reference information; and controlling the movement of the mobile robot based on the first relative position. Through the technical solution disclosed in the present application, the localization accuracy of the mobile robot can be improved.

16 Claims, 5 Drawing Sheets

(56) References Cited

FOREIGN PATENT DOCUMENTS

| | | | |
|---|---|---|---|
| CN | 106527424 | A | 3/2017 |
| CN | 106647742 | A | 5/2017 |
| CN | 106660214 | A | 5/2017 |
| CN | 107291080 | A | 10/2017 |
| CN | 107833236 | A | 3/2018 |
| CN | 107885206 | A | 4/2018 |

OTHER PUBLICATIONS

International Patent Application No. PCT/CN2018/090501, International Search Report and Written Opinion with English Translation dated Mar. 11, 2019, 14 pages.

Li, Qiang, "Research on Monocular Vision-based Realtime Distance Measurement Algorithm", Information & Technology, China Master's Theses Full-Text Database, Mar. 15, 2017, 75 pages.

\* cited by examiner

MOBILE CONTROL METHOD, MOBILE ROBOT AND COMPUTER STORAGE MEDIUM

RELATED APPLICATION

This application is a continuation application of International Patent Application No. PCT/CN2018/090501, filed Jun. 8, 2018, the entire contents of which are hereby incorporated by reference.

TECHNICAL FIELD

The present application relates to the field of intelligent robots, in particular to a method for controlling a movement of a mobile robot, a mobile robot and a computer storage medium.

BACKGROUND

A mobile robot is a machine which works automatically. The mobile robot can be operated under the command of human operators or in pre-programmed programs, and can act according to principles set out by the artificial intelligence technology. This type of mobile robot can be used indoors or outdoors, and can be used in industry or household. For example, the mobile robot can be used to replace security guards to perform patrol, or replace people to clean the surface. The mobile robot can also be used to accompany family members or assist in doing office work. Because of the differences among fields to which different mobile robots are applied, moving modes of the mobile robots in various fields are different. For example, the mobile robots can use wheel-type moving mode, walking-type moving mode or chain-type moving mode.

A mobile robot performs movement operations based on navigation control technology. Wherein, influenced by the scenario in which the mobile robot is applied, when the mobile robot is located at an unknown position in an unknown environment, SLAM (Simultaneous Localization and Mapping) technology can be used to assist the mobile robot in creating a map and performing navigation operations. Specifically, the mobile robot can build a map based on movement information provided by the motion sensor, and provide navigation capabilities for the mobile robot based on the built map, such that the mobile robot can move autonomously. However, for a movement mechanism used for the mobile robot such as a wheel, the travel distances of wheel moving over surfaces with different materials are not the same, such that there are large differences between the built map and a map in the actual physical space. During the movement of the robot in an environment, it is necessary to detect in real time whether there are obstacles in the moving direction and adjust the movement mode of the robot based on the detection result. Existing obstacle sensors, such as ultrasonic sensors, infrared sensors, and laser sensors, can only detect some types of obstacles, and detection failure may occur for obstacle which is low and close to the ground.

SUMMARY

The present application provides a method for controlling a movement of a mobile robot, a mobile robot and a computer storage medium, for solving the problem of inaccurate localization of a robot based on data provided by a sensor, and obstacle detection and distance determination for a robot in the prior art.

In one aspect, the present application provides a method for controlling a movement of a mobile robot, the mobile robot is provided with an image acquisition device, and the method comprises the following steps: identifying a border line between a first obstacle and a ground from an image captured by the image acquisition device; determining a first relative position between a physical position corresponding to the border line and the mobile robot based on preset physical reference information; and controlling the movement of the mobile robot based on the first relative position.

In some embodiments, the step of identifying a border line between a first obstacle and a ground from an image captured by the image acquisition device comprises: identifying an object image region matched with a preset object label from the image captured by the image acquisition device, and determining a ground image region from the image; and taking an intersection line between the ground image region and the object image region as the border line between the first obstacle and the ground.

In some embodiments, the step of identifying an object image region matched with a preset object label from the image captured by the image acquisition device comprises: identifying the object image region matched with the preset object label from the captured image by a first neural network.

In some embodiments, the step of determining a ground image region from the image comprises: extracting ground feature information of the image in a preset image boundary region, and determining the ground image region in the image based on the ground feature information.

In some embodiments, the step of determining a ground image region from the image comprises: determining whether the identified object image region belongs to the ground image region based on an object label corresponding to the identified object image region and a position of the identified object image region in the image, and classifying the determined object image region belonging to the ground image region as the ground image region in the image.

In some embodiments, the step of determining a ground image region from the image comprises: determining whether the identified object image region belongs to the ground image region based on a preset size condition.

In some embodiments, the physical reference information comprises: a physical height between the image acquisition device and the ground, a physical parameter of the image acquisition device, and an angle between an optical axis of the image acquisition device and a horizontal plane or vertical plane.

In some embodiments, the step of identifying a border line between a first obstacle and the ground from an image captured by the image acquisition device comprises: identifying the border line between the first obstacle and the ground in the image by a second neural network.

In some embodiments, the step of determining a first relative position between a physical position corresponding to the border line and the mobile robot based on preset physical reference information comprises: determining the first relative position between a physical position corresponding to at least one pixel point on the border line and the mobile robot based on the preset physical reference information.

In some embodiments, the step of controlling the movement of the mobile robot based on the first relative position comprises: updating first obstacle information in a preset map according to the obtained first relative position; and planning a route of the mobile robot within at least one unit space based on the updated map, and controlling the movement of the mobile robot based on the planned route.

In some embodiments, the method further comprises the following steps: acquiring, from a sensing device in the mobile robot, a second relative position between a second obstacle and the mobile robot, the second obstacle is an obstacle whose border line with the ground is not identified; and controlling the movement of the mobile robot based on the first relative position and the second relative position.

In some embodiments, the step of controlling the movement of the mobile robot based on the first relative position and the second relative position comprises: updating first obstacle information and second obstacle information in a preset map according to the first relative position and the second relative position; and planning a route of the mobile robot within at least one unit space based on the updated map, and controlling the movement of the mobile robot based on the planned route.

In some embodiments, the method further comprises the following steps: generating sample information according to an image containing the second obstacle captured by the image acquisition device and the second relative position between the second obstacle and the mobile robot; and sending the sample information to a server for optimization of a border line recognition algorithm.

In some embodiments, the method further comprises a step of updating a preset border line recognition algorithm based on feedback information from the server, and identifying a border line between the second obstacle and the ground in a subsequently captured image containing a corresponding second obstacle based on the updated border line recognition algorithm.

In some embodiments, the mobile robot is a mobile robot with a monocular camera device.

In another aspect, the present application provides a mobile robot, the robot comprises an image acquisition device, configured to capture images during movement of the mobile robot; a movement device, configured to drive, in a controlled manner, the entire mobile robot to move; a storage device, configured to store the captured images, preset physical reference information, preset object labels, and at least one program; and a processing device, configured to invoke the at least one program and perform the following steps: identifying a border line between a first obstacle and a ground from an image captured by the image acquisition device; determining a first relative position between a physical position corresponding to the border line and the mobile robot based on preset physical reference information; and controlling the movement of the mobile robot based on the first relative position.

In some embodiments, the image acquisition device is provided on a housing of the mobile robot based on the physical reference information.

In some embodiments, the mobile robot is a mobile robot with a monocular camera device.

In some embodiments, the mobile robot is a cleaning robot.

In yet another aspect, the present application provides a navigation method for a mobile robot, the mobile robot is provided with an image acquisition device, and the navigation method comprises the following steps: identifying a border line between a first obstacle and a ground from an image captured by the image acquisition device; determining a first relative position between a physical position corresponding to the border line and the mobile robot based on preset physical reference information; and generating a navigation route based on a current position of the mobile robot and the first relative position.

As described above, in the method for controlling a movement of a mobile robot, the mobile robot, and the computer storage medium of the present application, through the technical solution that identifying the border line between the obstacle and the ground in the image captured by the image acquisition device to detect the obstacle, obtaining the distance between the obstacle and the mobile robot through determining the relative position between the mobile robot and the obstacle based on the preset physical reference information, and localizing the robot according to the above-mentioned result, the localization accuracy of the mobile robot can be improved.

DETAILED DESCRIPTION

Figure 1:
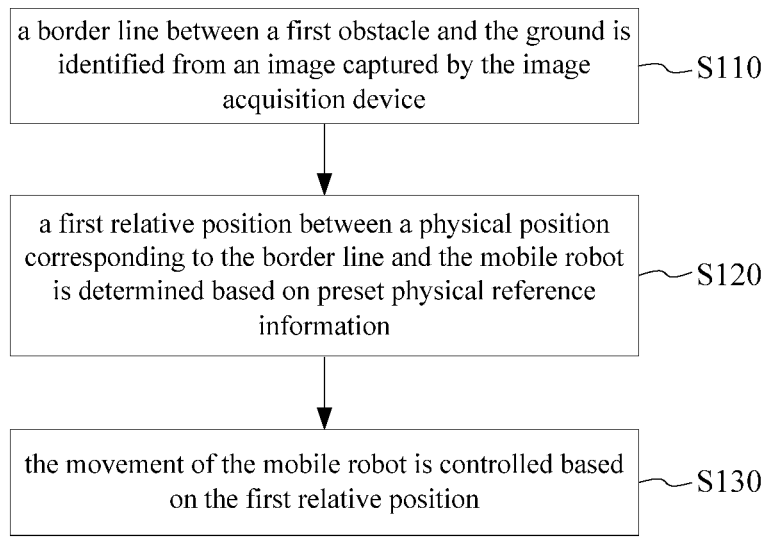
FIG. 1 shows a flow diagram of a method for controlling a movement of a mobile robot of the present application in an embodiment.

Implementations of the present application will be described below through specific embodiments, and those skilled in the art can easily understand other advantages and effects of the present application from the contents disclosed in the present specification.

In the following description, several embodiments of the present application are described with reference to the attached figures. It should be understood that other embodiments may also be used, and changes of mechanical composition, structure, electric and operation may be made without departing from the spirit and scope of this application. The following detailed description should not be considered restrictive, and the scope of the implementation of this application is limited only by the published patent claims. The terminology used herein is intended only to describe specific embodiments and is not intended to restrict this application. Spatial terms, such as "up", "down", "left", "right", "lower part", "higher part", "bottom", "below", "above", "upwards", etc., can be used in this application to illustrate the relationship between one element and another or one feature and another shown in the figure.

Furthermore, as used herein, such single forms as "one", "a" and "the" aim at also including the plural forms, unless contrarily indicated in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

Due to there are a large difference between a map built by SLAM and a real scenario in some application fields, a VSLAM (Visual Simultaneous Localization and Mapping) technology has been developed on the basis of SLAM, in VSLAM, a monocular or binocular camera device is added to compensate for errors of movement information provided by a sensor based on a positional change of a feature in the image. However, in the case of a monocular camera device, it still needs to use a ranging sensor such as a laser sensor to acquire distance information between a mobile robot and an obstacle in a real physical space. Alternatively, a higher-cost binocular camera device are used to take images and reconstruct a three-dimensional model of a photographed scenario, so as to obtain the distance information between the mobile robot and the obstacle in the real physical space. In the above-mentioned solutions, the hardware cost of the mobile robot is increased for improving the localization accuracy.

For this reason, the present application provides a method for controlling a movement of a mobile robot, the method is performed by a mobile robot with an image acquisition device. During movement of the mobile robot, through the method for controlling a movement of a mobile robot of the present application, the mobile robot determines the distance between a ground object and the mobile robot according to an image containing the ground captured by a single image acquisition device (or called a monocular camera device) and corresponding physical reference information of the robot when the robot is taking the image, and then adjusts a navigation route and movement control in time, so that the navigation and obstacle avoidance can be achieved accurately. In some embodiments, the mobile robot includes one image acquisition device, and the mobile robot performs localization and movement control operations according to images captured by the image acquisition device.

In some other embodiments, the mobile robot is also be equipped with a plurality of image acquisition devices, and the mobile robot performs localization and movement control operations only according to images captured by one of the plurality of image acquisition devices. In this case, it is also regarded as a mobile robot with a monocular camera. The mobile robot can build a map based on the method for controlling a movement of a mobile robot provided by the present application in combination with SLAM technology. The mobile robot can also move autonomously based on a pre-built map. The pre-built map includes but is not limited to a map built based on the SLAM technology, or a map built based on site planning. The mobile robot includes but is not limited to: the robot which can move autonomously based on the map built in advance, such as a mobile robot used for accompanying family members, a cleaning robot, and a patrol mobile robot.

Please refer to FIG. 1, which shows a flow diagram of a method for controlling a movement of a mobile robot of the present application in an embodiment. The method for controlling a movement of a mobile robot is performed by a processing device included in the mobile robot. In one embodiment, the processing device can preset the time interval at which an image acquisition device captures images, and then the processing device acquires static images at different time captured by the image acquisition device at the preset time interval, and performs the following steps S110 to S130. In another embodiment, the image acquisition device can capture videos, since video is composed of image frames, therefore, the processing device can continuously or discontinuously collect the image frames in the acquired video, and then the processing device selects one frame of image as an image and performs steps S110 to S130.

In step S110, a border line between a first obstacle and the ground is identified from an image captured by the image acquisition device.

The first obstacle refers to an object placed on the ground, such as a table, a chair, a tiled object, a water bottle, a flower pot, or the like. The border line between the first obstacle and the ground includes but is not limited to: an intersection line formed between a supporting part of the object and the ground, an intersection line formed when the object is close to the ground, or the like. Examples are an intersection line between legs of a table and the ground, and an intersection line of a flowerpot and the ground. Another example is a shadow line formed between a lower edge of a short leg object and the ground. The border line is mapped in the image after being photographed. During movement of the robot, the processing device controls the movement device of the mobile robot to move along a navigation route, and controls the image acquisition device of the mobile robot to capture images along the way.

Figure 2:
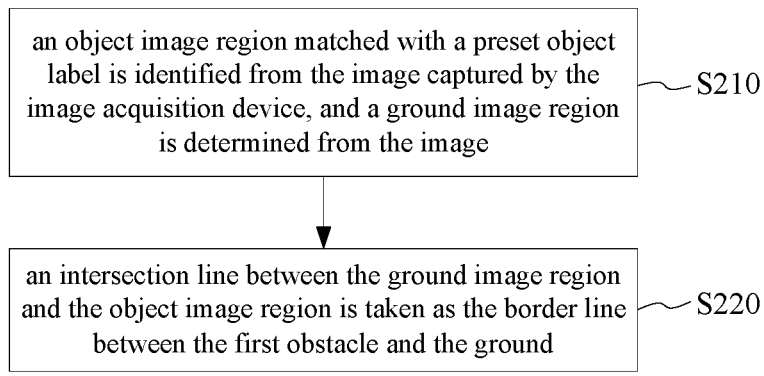
FIG. 2 shows a flow diagram of step S110 in the method for controlling a movement of a mobile robot of the present application in an embodiment.

As to the identification method of the border line between the first obstacle and the ground, in an embodiment, referring to FIG. 2, which shows a flow diagram of step S110 in the method for controlling a movement of a mobile robot of the present application in an embodiment, as shown, step S110 includes steps S210 and S220.

In step S210, an object image region matched with a preset object label is identified from the image captured by the image acquisition device, and a ground image region is determined from the image.

Here, in one aspect, the processing device identifies an object image region matched with a preset object label from the image captured by the image acquisition device. The identified object image region is represented by a contour image region of the identified object, or by a external rectangle thereof. The manner of representing the object image region by the object contour image region includes obtaining the object image region of the identified object by a contour line extraction method. The contour line extraction method includes but is not limited to binary method, a grayscale method, a canny operator method. The external rectangle is determined based on the identified contour image region.

In an embodiment, in the case where object labels are characterized by image features, the image features of the corresponding objects is stored in a storage device in advance. After the image acquisition device captures an image and outputs it to the processing device, the processing device performs identification processing on the captured image based on the pre-stored image features of each object to determine the object image region in the image.

In another embodiment, in the case where object labels are characterized by object classifications, a first neural network such as CNN (Convolutional Neural Network) is trained in advance, so that an object label representing a table, a chair, a tiled object, an unknown object, or the like, and the position of an object in the image can be marked on an input picture. After the image acquisition device captures an image and outputs it to the processing device, the processing device identifies, based on the object label provided by the first neural network, an object image region matched with the object label from the captured image. For example, the processing device identifies a table and a chair from the captured image, and determines that the regions corresponding to the table and chair belong to object image regions.

In another aspect, the processing device also determines a ground image region from the captured image.

Figure 3:
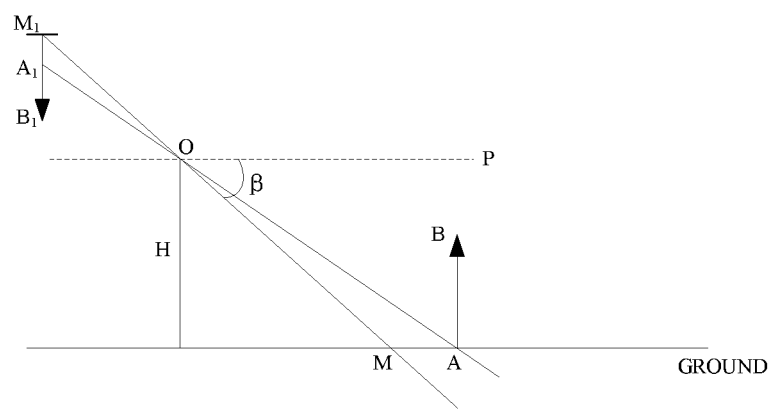
FIG. 3 shows an imaging schematic diagram of a positional relationship between an object and the ground in an image and a positional relationship between the corresponding object and the ground in an actual physical space.

In an embodiment, during the control of the movement of the movement device based on the built map, or during the control of the movement of the movement device for building a map by SLAM technology, the processing device determines a current position of the mobile robot in the map based on movement information provided by a movement sensor for example. To prevent random obstacles such as chairs and toys from being placed on the current route, the processing device acquires the image captured by the image acquisition device, and determines a ground image region in the image according to preset regional classification of a ground image region in the image, and determines an object image region. The manner of the preset regional classification of the ground image region in the image includes: determining, by the processing device, a part of the image as the ground image region based on a correspondence relationship between an imaging orientation of the image acquisition device and an orientation of the object in an actual physical space. For example, referring to FIG. 3, which shows an imaging schematic diagram of a positional relationship between an object and the ground in an image and a positional relationship between the corresponding object and the ground in the actual physical space, as shown, let a physical height of a lens center point O of the image acquisition device from the ground is H, an optical axis OP of the image acquisition device is parallel to the ground, and the object AB in an actual physical space is placed on the ground, wherein a point A is a point of intersection between the object and the ground, and M is a ground boundary point captured based on an angle of field $\alpha$ of the image acquisition device, then an angle between OM and OP is $\beta=\alpha/2$, an imaging position of the ground M in the image is $M_1$, and an image of the object AB in the image is $A_1B_1$, the processing device classifies an upper boundary region of the image as a ground image region based on a preset number of pixel rows, that is, the processing device classifies a part of region with the preset number of pixel rows in the region from $M_1$ to $A_1$ as the ground image region in the image. As the object image region located in the ground image region describes the positional relationship with the object closest to the mobile robot in the actual physical space, the processing device determines the distance and orientation of the object closest to the mobile robot and placed on the ground by performing subsequent steps. During map building, the processing device marks obstacle information in a corresponding grid based on the determined distance and orientation.

In another embodiment, to improve the accuracy of identifying the ground image region, the processing device determines the ground image region through the following method: the processing device extracts ground feature information of the image in a preset image boundary region, wherein the preset image boundary region is preset according to physical parameters such as the height of the camera and the optical axis direction, and the angle of field, and the processing device determines the ground image region in the image based on the ground feature information. The image boundary region is a boundary region delimited based on a correspondence relationship between an imaging orientation of the image acquisition device and an orientation of the object in an actual physical space. For example, the processing device delimits an image boundary region from an upper boundary of the image based on the imaging schematic diagram shown in FIG. 3, and the processing device extracts ground feature information in the image boundary region. To reduce the influence of the object image region identified in the image boundary region on the identification of the ground feature information, the processing device extracts the ground feature information in the image boundary region on the basis of cutting out the object image region.

Here, the ground feature information can be characterized by a ground texture feature. The texture feature is a global feature and used to describe surface properties of the object corresponding to the image region. Therefore, the texture feature of the image boundary region is extracted by a statistical method, a model method, a signal processing method, a structural method, or the like. The statistical method is, for example, a texture feature analysis algorithm of a gray level co-occurrence matrix. The model method is, for example, a Markov random field model algorithm, an autoregressive model algorithm, or the like. The signal processing method is, for example, Tamura texture feature. The processing device extracts the ground feature information through performing any of the above-mentioned algorithms, and traverses the entire image for the extracted ground feature information, and marks a part of the image that meets the ground texture feature by using an image segmentation algorithm based on texture similarity, wherein the image segmentation algorithm includes but is not limited to image threshold processing, region growth, region aggregation and other methods, and then determines the ground image region in the entire image.

In yet another embodiment, when an object label contained in the image is identified to be a tiled object, as the tiled object includes a floor mat paved on the floor and a tapestry hanged on the wall, the ground image region determined by feature extraction is incomplete. The ground image region in the image need to be supplemented, i.e. based on the object label corresponding to the identified object image region and the position of the identified object image region in the image, determining whether the identified object image region belongs to the ground image region, and classifying the determined object image region determined belonging to the ground image region as the ground image region in the image.

In an example, the processing device first identifies an object label of the object image region based on a first neural network. When the object label is a tiled object, the processing device further determines the position of the identified tiled object in the image. For example, when the processing device determines that the identified tiled object image region at least partially falls into the preset ground image region, it indicates that the tiled object region belongs to the ground image region, for example, the tiled object is a floor mat. When the processing device determines that the identified tiled object does not overlap with the preset ground image region, it indicates that the tiled object region belongs to the object image region, for example, the tiled object is a tapestry.

In another example, the position is characterized by a positional relationship between the tiled object image region and the ground image region determined based on ground feature information. For example, the relationship includes intersection or non-intersection between the tiled object and the ground image region. When the processing device determines that the image region of the tiled object intersects with the ground image region, it indicates that the corresponding tiled object (such as a floor mat) in the physical space is an object paved on the ground, and the processing device adds the image region of the tiled object into the ground image region. When the processing device determines that the image region of the tiled object does not intersect with the ground image region, it indicates that the corresponding tiled object (such as a tapestry) in the physical space is not an object paved on the ground, and the processing device does not add the image region of the tiled object into the ground image region.

It should be noted that the object label corresponding to the tiled object is only an example and not a limitation of the present application, and the object label will vary depending on the working environment of the mobile robot and other functions of the mobile robot. For example, an outdoor mobile robot adds a gravel image region marked with a gravel label to the ground image region. As another example, a cleaning robot does not add an region corresponding to an object label (such as paper, coiled thread, etc.) identified to be intersected with the ground image region into the ground image region.

In addition, an object label trained by the first neural network also includes an unknown object, and the processing device marks an image region corresponding to an image which is unidentified and is clearly an object in the image as an unknown object label by the trained first neural network, and the processing device further determines whether the identified object image region belongs to the ground image region based on a preset size condition. The size condition is set according to the application scenario of the mobile robot before it leaves the factory or set according to the application scenario of the mobile robot by a user. For example, the size condition includes at least one of: the area defined by the object image region being less than a preset area threshold, and the length of an intersection line between the object image region and the ground image region being less than a preset length threshold.

Here, when the identified object image region intersects with the ground image region, the processing device determines whether the identified object image region belongs to the ground image region based on the object label and the preset size condition. For example, the processing device compares the area of the identified object image region corresponding to the unknown object label with the area threshold in the preset size condition, and if the area is less than the area threshold, it can be determined that the object corresponding to the identified unknown object label in the actual physical space does not affect the movement of the mobile robot, so the identified object image region corresponding to the unknown object label is added to the ground image region; otherwise, if the area is greater than or equal to the area threshold, it can be determined that the object corresponding to the identified unknown object label in the actual physical space affects the movement of the mobile robot, so the identified object image region corresponding to the unknown object label is not added to the ground image region, and it is determined to be an obstacle.

It should be noted that the manner by which the processing device determines whether the object image region corresponding to the unknown object label belongs to the ground image region is only an example, and is not a limitation of the present application. In fact, the object label, size condition and the like that the processing device processes will vary depending on the usage scenario of the mobile robot and the hardware structure of a movement device equipped therewith.

In step S220, an intersection line between the ground image region and the object image region is taken as the border line between the first obstacle and the ground. For example, in the case where the identified object image region or ground image region is represented by a contour line of the identified object or ground, the border line between the object (i.e., the first obstacle) and the ground is the intersection line between the object contour line and the ground contour line.

As to the identification manner of the border line between the first obstacle and the ground, in another embodiment, a second neural network is used to identify the border line between the first obstacle and the ground in the image. In practical applications, training can be performed in advance on the second neural network, such as a CNN, such that a border line between the first obstacle and the ground can be identified from the input image. The input layer of such neural network is images acquired based on the viewpoint of the robot, the size of the output layer is the region of the possible ground in the preset image, each pixel point on the output layer is the occurrence probability of the obstacle, and numerous convolutional layers are between the input layer and the output layer. In the training process, images which are artificially marked in advance can be used, and the weight of the neural network can be adjusted by utilizing a back propagation algorithm, such that the position of the obstacle output by the network is close to the position of the obstacle which is marked artificially. After the image acquisition device captures images and output the captured image to the processing device, the processing device identifies the border line between the first obstacle and the ground based on the second neural network.

Next, the processing device performs step S120. In step S120, a first relative position between a physical position corresponding to the border line and the mobile robot is determined based on preset physical reference information.

The physical reference information includes but is not limited to a physical height between the image acquisition device and the ground, physical parameters of the image acquisition device, and the angle between the optic axis of the image acquisition device and the horizontal or vertical plane. Herein, those skilled in the art measure the distance between an imaging center of the image acquisition device and the ground in advance, and consider the distance as the physical height or as an initial value of the physical height and store it in the storage device. The physical height can also be obtained through a calculation of the design parameters of the mobile robot in advance. The angle or an initial value of the angle between the optic axis of the image acquisition device and the horizontal or vertical plane can be obtained according to the design parameters of the mobile robot. For a mobile robot with an adjustable image acquisition device, the stored angle can be determined by adding/subtracting an adjusted deflection angle on the initial value of the angle, and the stored physical height is determined by adding/subtracting an adjusted height on the initial value of the physical height. The physical parameters of the image acquisition device include an angle of view of lens, a focal length of lens, and so on.

Here, after the processing device determines the border line between the first obstacle and the ground from the acquired images, based on the imaging principle calculation and the physical reference information, the processing device determines the distance between the object (the first obstacle) placed on the ground and captured in the image and the mobile robot, and determines the orientation angle between corresponding object and the mobile robot.

Figure 4:
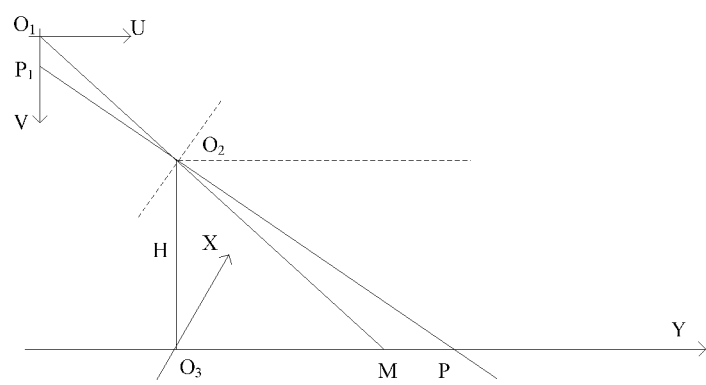
FIG. 4 shows a principle schematic diagram of determining a relative position between an object and a mobile robot based on an imaging principle.

Referring to FIG. 4 which shows a principle schematic diagram of determining the relative position between an object and a mobile robot based on an imaging principle. As shown in the figure, there are three coordinate systems in the figure, namely, an image coordinate system $UO_1V$, a world coordinate system $XO_3Y$, and a camera coordinate system with $O_2$ as the origin. Suppose the position where the object is placed on the ground contains point P, and the length of $O_3P$ can be calculated based on the known physical height H between the image acquisition device and the ground, the distance $O_3M$ on the Y axis between the world coordinate point corresponding to the image coordinate center and the image acquisition device, the image coordinate $O_1$ of the central point of the lens, the image coordinate $P_1$ of the measuring pixel point, the length and width of the actual pixel, and the focal length of the image acquisition device. Therefore, the physical distance between the mobile robot and the point P of the object can be obtained according to the length of $O_3P$.

To determine the orientation angle between the point P of the object and the mobile robots, the processing device can calculate the orientation angle between the mobile robot and the point P of the object at the current time according to the corresponding relationship between each pixel point in the image which is stored in the storage device in advance and the actual physical orientation angle. Wherein each pixel point corresponds to an orientation angle, and the orientation angle can be calculated based on parameters such as quantity of pixels, a focal length and an angle of view of an image acquisition device.

Based on the above manner, the processing device determines a first relative position between the physical position corresponding to at least one pixel point on the border line and the mobile robot based on the preset physical reference information and the pixel position of each pixel point on the border line in the image, wherein the first relative position includes a physical distance and an orientation angle. Wherein the processing device can perform traversal operation on each pixel point or feature point of the border line according to the above manner, so as to determine the relative positions of multiple position points of the identified border line, namely, the physical distances and the orientation angles. Wherein the feature point includes but is not limited to an angular point, an end point, an inflection point of the border line. For example, based on the angular point and the inflection point of the border line, the processing device determines the relative position between each object local position corresponding to each feature point on the border line and the mobile robot respectively. The processing device can only determine the closest relative position between the identified object and the mobile robot according to the above manner. For example, the processing device determines the closest relative position between the identified object and the mobile robot through the image position of the border line in the image, so as to adjust the navigation route timely.

The processing device determines first relative positions between one or more first obstacles photographed in the image and the mobile robot in the above manner.

Then, in step S130, the movement of the mobile robot is controlled based on the first relative position.

In an embodiment, step S130 includes: updating first obstacle information in a preset map according to the first relative position; and planning a route of the mobile robot within at least one unit space based on the updated map, and controlling the movement of the mobile robot based on the planned route.

For the step of updating first obstacle information in a preset map according to the first relative position, in an example, the processing device determines a positional relationship between the mobile robot and the physical position corresponding to the border line in the preset map according to the obtained first relative position. In the mobile robot with a map built therein, the above-mentioned localization method is used to update unmarked obstacles in the map.

In another example, the processing device determines a positional relationship between the mobile robot and the identified object in the preset map according to the obtained first relative position and the object label. In the mobile robot with a map built therein, the above-mentioned localization method is used to update unmarked and temporarily placed object on the map, such as ball, chair, and temporary warning sign.

In an embodiment, the processing device determines the positional relationship between the mobile robot and the physical position corresponding to the border line in the preset map according to the determined first relative position only. Taking the map being a pre-built map based on site planning as an example, the map is built based on a unit vector and is scaled down based on the physical size of the actual site; and based on the positional relationship between each identified border line and the mobile robot in the image, and the length and direction of the unit vector, the processing device marks obstacle information at a corresponding position in the map and updates the map. Taking the map being a map built based on a grid as an example, the map is built based on a unit grid; and based on the positional relationship between each identified border line and the mobile robot in the image, and the length and direction of the unit grid, the processing device marks obstacle information at a corresponding position in the map and updates the map.

Figure 5:
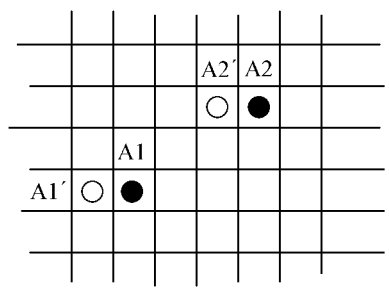
FIG. 5 shows a schematic diagram of correcting localization errors of positions A1 and A2 in map data based on a relative position change.

In another embodiment, the processing device determines a positional relationship between the mobile robot and the identified object in the map according to a relative position measured based on the determined first relative position and the object label, and the movement information provided by the movement sensor. The processing device controls the movement device to move at least one unit space range according to a randomly set navigation route or according to a known navigation route, and determines a relative position change between the object with the same object label and the mobile robot during the movement, and with the movement sensor acquiring the movement information, the processing device corrects errors in the movement information based on the relative position change and the movement information. The unit space range includes but is not limited to a unit grid and a unit vector. The movement sensor includes but is not limited to a speed sensor, an odometer sensor, a pressure sensor, and a cliff sensor. For example, referring to FIG. 5, which shows a schematic diagram of correcting localization errors of positions A1 and A2 in map data based on a relative position change, as shown, the position A1 is a current position of the mobile robot located in the grid map based on the movement information, and the processing device controls the movement device to move from A1 to A2; during the movement, the processing device determines a relative position between the object with the same object label and the mobile robot based on the above steps more than once, and thereby determines a movement distance and orientation of the mobile robot moving from the position A1 to A2, compensates for errors in the movement information by using a relative position change between the positions A1 and A2 provided by the movement information, and a relative position change between the positions A1 and A2 determined by the captured image, and then corrects the position A1 to A1' and corrects the position A2 to A2' in the grid map according to the position of A1 after compensation. The processing device marks the position of the corresponding object and the corresponding object label in the corrected grid map, to obtain an updated map.

Then, based on the updated map, the processing device plans a route of the mobile robot within at least one unit space, and controls the movement of the mobile robot based on the planned route. Taking a cleaning robot as an example, a map stored therein is a pre-built grid map. The processing device divides the grid map into multiple cleaning regions based on the built grid map of an entire room, and the processing device determines a cleaning region where the mobile robot is located according to a current position of the mobile robot in the updated map, and plans a navigation route for moving one or two grid units within the cleaning region, and controls the movement of the mobile robot according to the planned navigation route, thereby achieving autonomous movement of the mobile robot. In an example, the processing device determines whether the first obstacle represented by the border line is located on the preset navigation route according to a relative position relationship between the mobile robot and the physical position corresponding to the border line in the updated map, and if so, adjusts the navigation route to bypass the marked object according to the range of the first obstacle represented by the border line in the map, and if not, continues to control the movement device according to the preset navigation route so that the mobile robot moves along the navigation route.

It should be noted that the manner of planning a navigation route of one or two grid units according to the updated grid map is only an example. In fact, the grid map is replaced with a vector map, and the number of grid units is determined according to the movement scenario of the mobile robot.

In the method for controlling a movement of a mobile robot of the present application, through the technical solution that identifying the border line between the first obstacle and the ground in the image captured by the image acquisition device, determining the relative position between the mobile robot and the obstacle based on the preset physical reference information, and localizing the robot according to the above-mentioned result, the localization accuracy of the mobile robot can be improved. In addition, the movement of the mobile robot can be controlled according to the determined relative position between the mobile robot and the border line, so that the robot can accurately avoid the obstacle represented by the border line during the movement, and the obstacle avoidance ability of the mobile robot can be improved.

Figure 6:
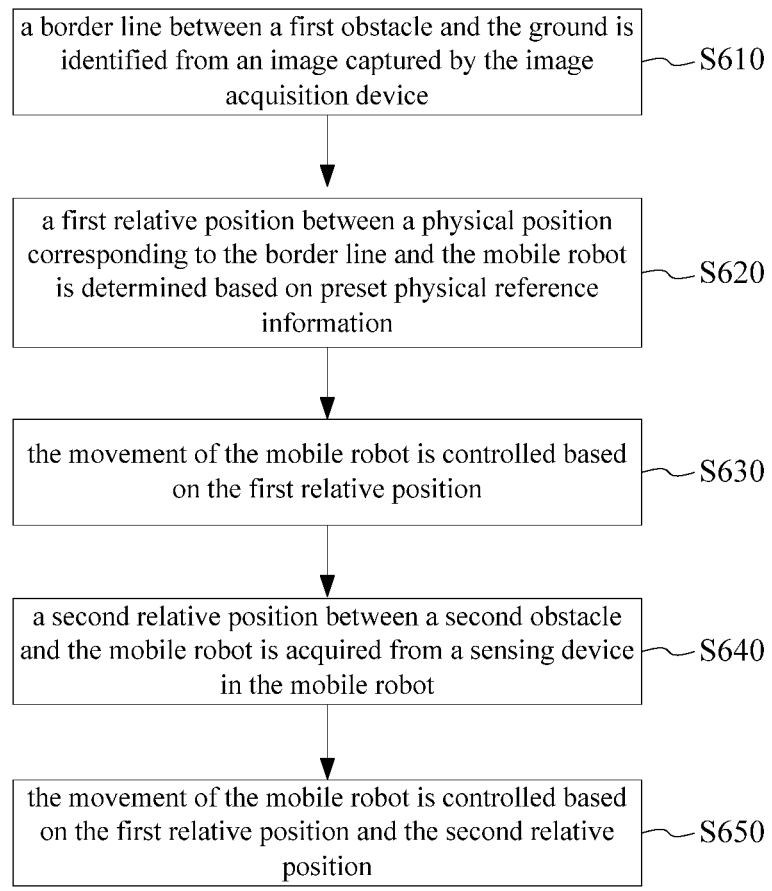
FIG. 6 shows a flow diagram of a method for controlling a movement of a mobile robot of the present application in another embodiment.

In addition, in practical applications, there are also unidentified border lines. In view of this, referring to FIG. 6, which shows a flow diagram of a method for controlling a movement of a mobile robot of the present application in another embodiment, as shown, the method for controlling a movement of a mobile robot of the present application includes steps S610, S620, S630, S640 and S650.

In step S610, a border line between a first obstacle and the ground is identified from an image captured by the image acquisition device. Step S610 is similar to step S110 described above, which will not be repeated here.

In step S620, a first relative position between a physical position corresponding to the border line and the mobile robot is determined based on preset physical reference information. Step S620 is similar to step S120 described above, which will not be repeated here.

In step S630, the movement of the mobile robot is controlled based on the first relative position.

In an embodiment, step S630 includes: updating first obstacle information in a preset map according to the obtained first relative position; and planning a route of the mobile robot within at least one unit space based on the updated map, and controlling the movement of the mobile robot based on the planned route. The implementation of Step S630 is similar to that of step S130 described above, which will not be repeated here.

To prevent missed identification of a border line, the processing device further performs step S640 during the movement of the mobile robot along the navigation route planned based on the first relative position.

In step S640, a second relative position between a second obstacle and the mobile robot is acquired from a sensing device in the mobile robot.

The second obstacle refers to an obstacle whose border line with the ground is not identified. For example, the second obstacle is an obstacle whose border line with the ground is not identified in the captured image. As another example, the second obstacle is an obstacle that is not photographed in the image due to a new addition. In addition, the sensing device includes a laser ranging sensor, an infrared sensor, a collision sensor, and the like. In an example, the second relative position between the second obstacle and the mobile robot is acquired by a laser ranging device during the movement of the mobile robot. In another example, during the movement of the mobile robot, a collision sensor of the mobile robot obtains position information of the second obstacle through collision, and then, the processing device of the mobile robot controls the mobile robot to return to the position where the image acquisition device took an image last time, and acquires the second relative position between the collided second obstacle and the mobile robot based on a movement distance provided by the processing device, or acquires the second relative position between the collided second obstacle and the mobile robot by a laser ranging sensor of the mobile robot.

In step S650, the movement of the mobile robot is controlled based on the first relative position and the second relative position.

In an embodiment, step S650 includes: updating first obstacle information and second obstacle information in the preset map according to the obtained first relative position and second relative position; and planning a route of the mobile robot within at least one unit space based on the updated map, and controlling the movement of the mobile robot based on the planned route. The implementation of Step S650 is similar to that of step S130 described above, which will not be repeated here.

In addition, in practical applications, missed identification may be exist in the method of identifying a border line based on an image, which leads to failure to avoid an obstacle due to inaccurate localization of the mobile robot. In view of this, a border line recognition algorithm used for identifying a border line can be updated to obtain a more accurate identification result. The border line recognition algorithm includes any of the foregoing algorithms for identifying a border line in an image, or other recognition algorithm capable of identifying a border line between an obstacle and the ground.

In view of this, the method for controlling a movement of a mobile robot of the present application further includes: generating sample information according to an image containing the second obstacle captured by the image acquisition device and the second relative position between the second obstacle and the mobile robot; and sending the sample information to a server for optimization of a border line recognition algorithm.

The sample information includes input information required for optimizing the border line recognition algorithm and output information for judging the optimization performance. In an embodiment, the sample information includes an image (i.e. input information) containing the second obstacle captured by the image acquisition device. The image is an original captured image, or the image is a processed image to prevent leakage of user information. For example, the processed image is an image obtained by performing mosaic processing on an original image or extracting a contour on the original image, so long as the image contains feature of the border line between the second obstacle and the ground. The sample information further includes the second relative position (i.e. output information) between the second obstacle and the mobile robot. The second relative position is sent to the server in the form of data, or the second relative position is also sent to the server in the form of an image (i.e. output information). For example, the second relative position is an image taken at the position where the mobile robot is controlled to return to due to a collision sensor of the mobile robot collides with the second obstacle during the movement of the mobile robot, the image contains the location of the boundary between the second obstacle and the ground. The image is then sent to the server in an original or processed form.

The server optimizes the border line recognition algorithm after receiving the sample information. In an example, the server optimizes, for the sample information sent by each mobile robot, the border line recognition algorithm preset in each robot to upgrade and update the robot. In another example, after receiving the sample information sent by multiple mobile robots, the service device compares and filters the data and performs unified optimization on the border line recognition algorithms preset in all mobile robots of the current version to upgrade and update the mobile robots of the current version in a unified manner.

In an example, in the case where an object image region and a ground image region are used to identify a border line, the border line recognition algorithm is optimized by optimizing an object image region identification method and a ground image region identification method. In the case of identifying the object image region by a first neural network, taking the image containing the second obstacle captured by the image acquisition device as an input to the first neural network, and the manually marked second obstacle as an output from the first neural network, parameters of the first neural network model are trained so as to improve the accuracy of identifying the object image region by the first neural network, obtain updated first neural network parameters, and obtain the optimized border line recognition algorithm.

In another example, in the case where a second neural network is used to identify the border line, the border line recognition algorithm is optimized by optimizing parameters of a second neural network model. In this case, taking the image containing the second obstacle captured by the image acquisition device as an input to the second neural network, and the obtained second relative position between the second obstacle and the mobile robot described above as an output from the second neural network, the second neural network model is trained so as to improve the accuracy of identifying the border line by the second neural network, obtain updated parameters of the second neural network, and obtain the optimized border line recognition algorithm.

After the server optimizes the border line recognition algorithm, the processing device of the mobile robot updates a preset border line recognition algorithm based on feedback information from the server, and identifies a border line between the second obstacle and the ground in a subsequently captured image containing the corresponding second obstacle by using the updated border line recognition algorithm. In an example, the processing device of the mobile robot updates parameters of a first neural network model preset in the mobile robot based on parameters of the first neural network model fed back by the server, and then performs identification based on the updated first neural network model. In another example, the processing device of the mobile robot updates parameters of a second neural network model preset in the mobile robot based on parameters of the second neural network model fed back by the server, and then performs identification based on the updated second neural network model.

In the method for controlling a movement of a mobile robot of the present application, through the technical solution that sending the sample information to the server and optimizing the border line recognition algorithm at the server, and updating the border line recognition algorithm preset in the mobile robot based on the optimized border line recognition algorithm, the localization and obstacle avoidance abilities of the mobile robot can be improved.

Figure 7:
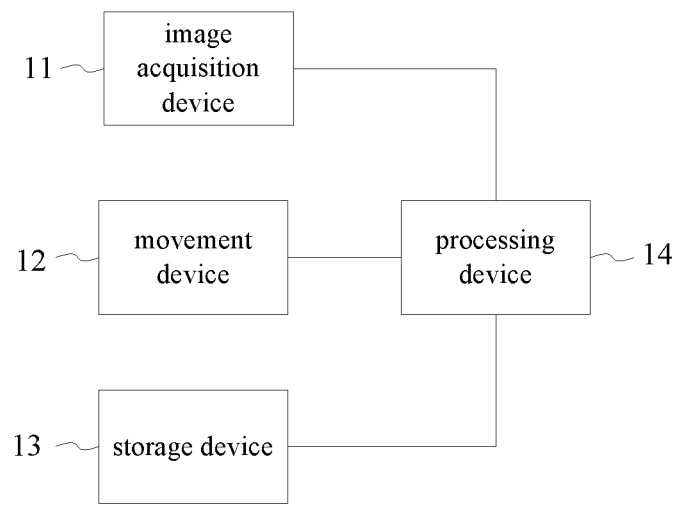
FIG. 7 shows a structure diagram of a mobile robot of the present application in an embodiment.

The present application further provides a mobile robot with an image acquisition device. The mobile robot includes but is not limited to a cleaning robot, a patrol robot and a robot for accompanying family members. The mobile robot performs the above method for controlling a movement of a mobile robot (i.e., movement control method). Please refer to FIG. 7 which shows a structural schematic diagram of the mobile robot of the present application in one embodiment. As shown in the figure, the mobile robot includes an image acquisition device 11, a movement device 12, a storage device 13 and a processing device 14. The image acquisition device 11, the movement device 12 and the storage device 13 are all connected with the processing device 14.

The image acquisition device 11 is configured to capture images during movement of the mobile robot. In some embodiments, the mobile robot includes one image acquisition device, and the mobile robot performs localization and movement control operations based on images captured by the image acquisition device. In other embodiments, the mobile robot includes more than one image acquisition device, and the mobile robot performs localization and movement control operations based on images captured by only one image acquisition device. The image acquisition device includes but is not limited to a camera, a video camera, an image acquisition module integrated with an optical system or a CCD chip, and an image acquisition module integrated with an optical system and a CMOS chip. A power supply system of the image acquisition device can be controlled by a power supply system of the mobile robot, and the image acquisition device captures images on the route along which the mobile robot moves. To ensure that the captured image contains the ground and objects located on the ground, the image acquisition device is provided on a housing of the mobile robot, provided on a side of or at an edge of a top surface of the mobile robot. For example, the image acquisition device is provided on the top surface of a cleaning robot at the body side.

It should be noted that the assembly position of the image acquisition device is related to the range of a field angle (also named as angle of view) of the image acquisition device, the height between the image acquisition device and the ground, and the angle between the optic axis of the image acquisition device and the horizontal or vertical plane, therefore, the position of the image acquisition device in the mobile robot is not limited herein. For example, the image acquisition device assembled in the mobile robot is provided with an adjustment component used for adjusting the angle, and during movement of the mobile robot, the image acquisition device captures images containing the ground through adjusting the adjustment component. Wherein the adjustment component can include for example a deflection mechanism and a telescoping mechanism. And the deflection mechanism is used to drive the image acquisition device to perform a deflection motion. Specifically, the deflection mechanism can adjust the range of the field angle (also named as angle of view) of the image acquisition device, and the angle between the optic axis of the image acquisition device and the horizontal or vertical plane by performing a deflection motion. The telescoping mechanism is used to drive the support of the image acquisition device to perform telescopic motion. Specifically, the telescoping mechanism can adjust the height between the image acquisition device and the ground by performing a telescopic motion. For example, the image acquisition device is assemble at the edge of the top surface of the cleaning robot and the angle of view is 60°, and the angle between the optic axis of the image acquisition device and the horizontal plane is 15°.

It should be noted that the angle between the optic axis of the image acquisition device and the horizontal plane can be other values, as long as the image acquisition device can capture the ground image region when capturing images. In addition, those skilled in the art should understand that, the angle between the optic axis and the vertical line or the horizontal line is only an example but not to limit the accuracy of the angle thereof within the range of 1°. The accuracy of the angle can be higher according to the actual design requirements of the robot, for example, more than 0.1°, 0.01° or the like. Endless examples will not be recited herein.

The movement device 12 is configured to controllably drive the mobile robot to move. Wherein the movement device 12 adjusts the movement distance, the movement direction, movement speed, movement acceleration and so on under the control of the processing device 14.

In some embodiments, the movement device 12 includes a drive unit and at least two sets of rolling wheels. Wherein at least one set of rolling wheels in at least two sets of rolling wheels is a controlled set of rolling wheels. The drive unit is connected with the processing device, and the drive unit is configured to drive the controlled set of rolling wheels to roll based on the movement control instruction output by the processing device.

The drive unit includes a drive motor, and the drive motor is connected with the sets of rolling wheels to directly drive the sets of rolling wheels to roll. The drive unit can include one or more central processing units (CPU) or micro processing units (MCU) dedicated to the control of the drive motor. For example, the micro processing unit is configured to convert the information or data provided by the processing device into electric signals which control the drive motor, and control the rotating speed and steering of the mobile robot according to the electric signals, so as to adjust the movement speed and movement direction of the mobile robot. The information or data can be a deflection angle determined by the processing device. The processor in the drive unit can be shared with the processor in the processing device or can be arranged independently. For example, the drive unit is used as a slave processing device, the processing device is used as a primary device, and the drive unit performs movement control based on the control of the processing device. Or the drive unit is shared with the processor in the processing device. The drive unit receives data provided by the processing device through a program interface. The drive unit is configured to control the set of controlled rolling wheels to roll based on the movement control instructions provided by the processing device.

The storage device 13 is configured to store images captured by the image acquisition device 12, preset physical reference information, preset object labels, and at least one program. The images are captured by the image acquisition device and stored in the storage device 13.

The physical reference information includes but is not limited to a physical height between the image acquisition device and the ground, physical parameters of the image acquisition device, and the angle between the optic axis of the image acquisition device and the horizontal or vertical plane. Herein, those skilled in the art measure the distance between an imaging center of the image acquisition device and the ground in advance, and consider the distance as the physical height or as an initial value of the physical height and store it in the storage device 13. The physical height can also be obtained through a calculation of the design parameters of the mobile robot in advance. The angle or an initial value of the angle between the optic axis of the image acquisition device and the horizontal or vertical plane can be obtained according to the design parameters of the mobile robot. For a mobile robot with an adjustable image acquisition device, the stored angle can be determined by adding/subtracting an adjusted deflection angle on the initial value of the angle, and the stored physical height is determined by adding/subtracting an adjusted height on the initial value of the physical height. The physical parameters of the image acquisition device include an angle of view of lens, a focal length of lens, and so on.

The object label is screened in advance based on the environment in which the mobile robot moves and is stored in the storage device 13 of the mobile robot. The object label is used to describe the classification of objects which are possibly captured and placed in the environment or the image features of the objects in images.

In some examples, the object label is characterized by image feature of an object, and the image feature is used to identify target object in the image. For example, when a mobile robot is used in an indoor environment, the object label includes but is not limited to table, chair, sofa, flowerpot, shoes, sock, tiled object, and other image features.

Wherein the tiled object includes but is not limited to ground mat or floor tile map paved on the floor, and tapestry or picture hanged on the wall.

In other examples, the object label is characterized by object classification. Herein, the programs stored in the storage device include program of the trained neural network algorithm, and the object classification is identified from the image through executing the neural network algorithm. Still with the indoor environment as an example, the object label includes but is not limited to table, chair, sofa, flowerpot, shoes, sock, tiled object, and unknown objects. Wherein the tiled object includes but is not limited to ground mat or floor tile map paved on the floor, and tapestry or picture hanged on the wall. In addition, the unknown object indicates that one type of object which cannot be identified by the trained neural network but can be determined to be object, the unknown objects generally include objects which exist randomly indoors, for example, debris, toys, etc.

The program stored in the storage device 13 also includes related programs which are invoked by the processing device to perform localization processing based on an image captured by a single image acquisition device (monocular camera device) and which will be described below.

The storage device 13 includes but is not limited to a high speed random access memory and a non-volatile memory, for example, one or more disk storage devices, flash storage devices or other non-volatile solid state storage devices. In some embodiments, the storage device can also include a storage away from one or more processors, for example, a network attached storage accessed via an RF circuit or an external port and a communication network (not shown). Wherein the communication network can be an Internet, one or more intranets, a local area network (LAN), a wireless local area network (WLAN), a storage area network (SAN) or an appropriate combination thereof. A storage controller can control the access of other assemblies of robot such as a central processing unit (CPU) and a peripheral interface to the storage device.

The processing device 14 is in data communication with the storage device 13, the image acquisition device 11 and the movement device 12. The processing device 14 can include one or more processors. The processing device 14 can be operably coupled to a volatile memory and/or a non-volatile memory in the storage device 13. The processing device can perform instructions stored in the storage and/or non-volatile memory to perform operations in the robot, for example, identifying object image region and ground image region based on the object label, and determining the relative position between the target and the mobile robot. Thus, the processor can include one or more general-purpose microprocessors, one or more application specific integrated circuits (ASIC), one or more digital signal processors (DSP), one or more field programmable gate arrays (FPGA) or any combination thereof. The processing device is also operably coupled to an I/O port and an input structure, wherein the robot can interact with various other electronic apparatus by the I/O port, and the user can interact with a computing apparatus by the input structure. Therefore, the input structure can include a button, a keyboard, a mouse, a touchpad and the like. The other electronic apparatus can be a mobile motor in the movement device of the robot, or a slave processor dedicated to the control of the movement device in the robot, for example, a microcontroller unit (MCU).

In an example, the processing device is connected with the storage device, the image acquisition device and the movement device respectively through data cables. The processing device interacts with the storage device through a data read-write technology, and the processing device interacts with the image acquisition device and the movement device through an interface protocol. Wherein the data read-write technology includes but is not limited to a high-speed/low-speed data interface protocol, a database read-write operation and the like. The interface protocol includes but is not limited to an HDMI interface protocol, a serial interface protocol and the like.

The processing device 14 identifies a border line between a first obstacle and the ground from an image captured by the image acquisition device 11, determines a first relative position between a physical position corresponding to the border line and the mobile robot based on preset physical reference information, and controls the movement of the mobile robot based on the first relative position. The border line between the first obstacle and the ground is determined by identifying an object image region and a ground image region, or the border line between the first obstacle and the ground is determined through a neural network. In addition, in the case of a second obstacle whose border line with the ground is not identified, according to a second relative position between the second obstacle and the mobile robot acquired by a sensing device in the mobile robot, the processing device controls the movement of the mobile robot based on the above-mentioned first relative position and the acquired second relative position. In addition, the processing device also generates sample information according to an image containing the second obstacle captured by the image acquisition device and the second relative position between the second obstacle and the mobile robot acquired by the sensing device, and sends the sample information to a server, the server optimizes the border line recognition algorithm so as to update a border line recognition algorithm preset in the mobile robot, so that the localization accuracy of the mobile robot can be improved. The implementation of performing the method for controlling a movement of a mobile robot by the processing device is shown in FIGS. 1 to 6 and corresponding description thereof, which are not repeated here.

In the mobile robot of the present application, the processing device is used to identify the border line between the first obstacle and the ground in the image captured by the image acquisition device, determine the relative position between the mobile robot and the obstacle based on the preset physical reference information, and locate the mobile robot, so that the localization accuracy of the mobile robot can be improved. Furthermore, the mobile robot of the present application also controls the movement of the mobile robot according to the determined relative position between the mobile robot and the border line, so that the robot can accurately avoid the obstacle represented by the border line during the movement, and the obstacle avoidance ability of the mobile robot can be improved. In addition, the mobile robot of the present application can also optimize the border line recognition algorithm at the server based on the sample information and update the border line recognition algorithm preset in the mobile robot, so that the localization and obstacle avoidance abilities of the mobile robot can be improved.

Figure 8:
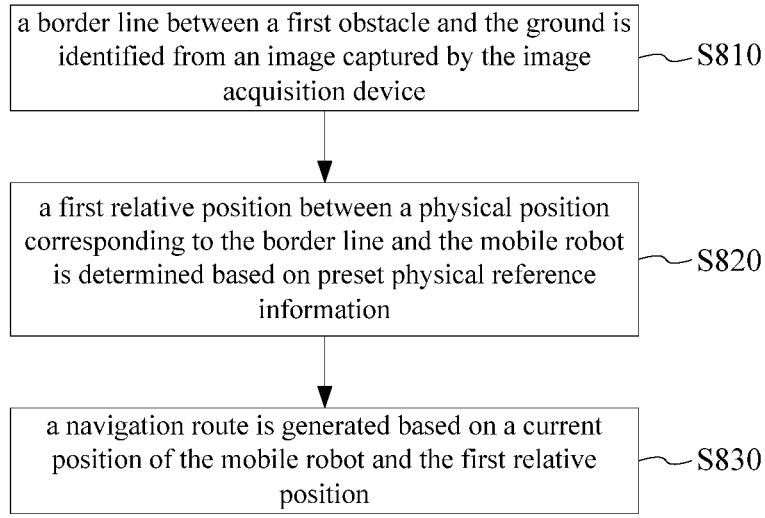
FIG. 8 shows a flow diagram of a navigation method of the present application in an embodiment.

The present application further provides a navigation method for a mobile robot with an image acquisition device. Referring to FIG. 8, which shows a flow diagram of a navigation method of the present application in an embodiment. The navigation method is performed by a processing system. As shown, the navigation method includes steps S810-S830.

In step S810, a border line between a first obstacle and the ground is identified from an image captured by the image acquisition device. Step S810 is similar to step S110 described above, which will not be repeated here.

In step S820, a first relative position between a physical position corresponding to the border line and the mobile robot is determined based on preset physical reference information. Step S820 is similar to step S120 described above, which will not be repeated here.

In step S830, a navigation route is generated based on a current position of the mobile robot and the first relative position.

In some embodiments, the current position of the mobile robot is obtained by a movement sensor of the mobile robot, such as an odometer sensor, and then, the processing system generates a navigation route along which the first obstacle can be avoided based on the current position of the mobile robot and the first relative position.

In an embodiment, step S830 includes: updating first obstacle information in a preset map according to the obtained first relative position; and planning a navigation route of the mobile robot within at least one unit space based on the updated map.

The step of updating first obstacle information in a preset map according to the obtained first relative position is step S830 is similar to the corresponding step in step S130, and is not repeated here.

For the step of planning a navigation route of the mobile robot within at least one unit space based on the updated map. taking a cleaning robot as an example, a map stored therein is a pre-built grid map. The processing system divides the grid map into multiple cleaning regions based on the built grid map of an entire room, and the processing system determines a cleaning region where the mobile robot is located according to a current position of the mobile robot in the updated map, and plans a navigation route for moving one or two grid units within the cleaning region, and controls the movement of the mobile robot according to the navigation route. In an example, the processing system determines whether the first obstacle represented by the border line is located on the preset navigation route according to a relative position relationship between the mobile robot and the physical position corresponding to the border line in the updated map, and if so, adjusts the navigation route to bypass the marked object according to the range of the first obstacle represented by the border line in the map, and if not, continues to control the movement device according to the preset navigation route so that the mobile robot moves along the navigation route.

It should be noted that the manner of planning a navigation route of one or two grid units according to the updated grid map is only an example. In fact, the grid map is replaced with a vector map, and the number of grid units planned is determined according to the movement scenario of the mobile robot.

In the navigation method of the present application, through the technical solution that identifying the border line between the first obstacle and the ground in the image captured by the image acquisition device, determining the relative position between the mobile robot and the obstacle based on the preset physical reference information, and localizing the robot according to the above-mentioned result, the localization accuracy of the mobile robot can be improved. In addition, a navigation route is generated according to the determined relative position between the mobile robot and the border line, and the current position of the mobile robot, so that the robot can accurately avoid the obstacle represented by the border line when moving along the navigation route, and the obstacle avoidance ability of the mobile robot can be improved.

In addition, in practical applications, there are also unidentified border lines. In view of this, referring to FIG. 9, which shows a flow diagram of a navigation method of the present application in another embodiment, as shown, the navigation method of the present application includes steps S910, S920, S930, S940 and S950.

In step S910, a border line between a first obstacle and the ground is identified from an image captured by the image acquisition device. Step S910 is similar to step S110 described above, which will not be repeated here.

In step S920, a first relative position between a physical position corresponding to the border line and the mobile robot is determined based on preset physical reference information. Step S920 is similar to step S120 described above, which will not be repeated here.

In step S930, a navigation route is generated based on a current position of the mobile robot and the first relative position.

In an embodiment, step S930 includes: updating first obstacle information in a preset map according to the obtained first relative position; and planning a route of the mobile robot within at least one unit space based on the updated map. The implementation of Step S930 is similar to that of step S830 described above, which will not be repeated here.

To prevent missed identification of a border line, the processing device further performs step S940 during the movement of the mobile robot along the navigation route planned based on the first relative position.

In step S940, a second relative position between a second obstacle and the mobile robot is acquired from a sensing device in the mobile robot.

The second obstacle refers to an obstacle whose border line with the ground is not identified. For example, the second obstacle is an obstacle whose border line with the ground is not identified in the captured image. As another example, the second obstacle is an obstacle that is not photographed in the image due to a new addition. In addition, the sensing device includes a laser ranging sensor, an infrared sensor, a collision sensor, and the like. In an example, the second relative position between the second obstacle and the mobile robot is acquired by a laser ranging device during the movement of the mobile robot. In another example, during the movement of the mobile robot, a collision sensor of the mobile robot obtains position information of the second obstacle through collision, and then, the processing device of the mobile robot controls the mobile robot to return to the position where the image acquisition device took an image last time, and acquires the second relative position between the collided second obstacle and the mobile robot based on a movement distance provided by the processing device, or acquires the second relative position between the collided second obstacle and the mobile robot by a laser ranging sensor of the mobile robot.

In step S950, a navigation route is generated based on a current position of the mobile robot, the first relative position and the second relative position.

In an embodiment, step S950 includes: updating first obstacle information and second obstacle information in a preset map according to the obtained first relative position and second relative position; and planning a route of the mobile robot within at least one unit space based on the updated map. The implementation of Step S950 is similar to that of step S830 described above, which will not be repeated here.

In addition, in practical applications, missed identification may be exist in the method of identifying a border line based on an image, which leads to failure to avoid an obstacle due to inaccurate localization of the mobile robot. In view of this, a border line recognition algorithm used for identifying a border line can be updated to obtain a more accurate identification result. The border line recognition algorithm includes any of the foregoing algorithms for identifying a border line in an image, or other recognition algorithm capable of identifying a border line between an obstacle and the ground.

In view of this, the navigation method of the present application further includes: generating sample information according to an image containing the second obstacle captured by the image acquisition device and the second relative position between the second obstacle and the mobile robot; and sending the sample information to a server for optimization of a border line recognition algorithm.

The sample information includes input information required for optimizing the border line recognition algorithm and output information for judging the optimization performance. In an embodiment, the sample information includes an image (i.e. input information) containing the second obstacle captured by the image acquisition device. The image is an original captured image, or the image is a processed image to prevent leakage of user information. For example, the processed image is an image obtained by performing mosaic processing on an original image or extracting a contour on the original image, so long as the image contains feature of the border line between the second obstacle and the ground. The sample information further includes the second relative position (i.e. output information) between the second obstacle and the mobile robot. The second relative position is sent to the server in the form of data, or the second relative position is also sent to the server in the form of an image (i.e. output information). For example, the second relative position is an image taken at the position where the mobile robot is controlled to return to due to a collision sensor of the mobile robot collides with the second obstacle during the movement of the mobile robot, the image contains the location of the boundary between the second obstacle and the ground. The image is then sent to the server in an original or processed form.

The server optimizes the border line recognition algorithm after receiving the sample information. In an example, the server optimizes, for the sample information sent by each mobile robot, the border line recognition algorithm preset in each robot to upgrade and update the robot. In another example, after receiving the sample information sent by multiple mobile robots, the service device compares and filters the data and performs unified optimization on the border line recognition algorithms preset in all mobile robots of the current version to upgrade and update the mobile robots of the current version in a unified manner.

In an example, in the case where an object image region and a ground image region are used to identify a border line, the border line recognition algorithm is optimized by optimizing an object image region identification method and a ground image region identification method. In the case of identifying the object image region by a first neural network, taking the image containing the second obstacle captured by the image acquisition device as an input to the first neural network, and the manually marked second obstacle as an output from the first neural network, parameters of the first neural network model are trained so as to improve the accuracy of identifying the object image region by the first neural network, obtain updated first neural network parameters, and obtain the optimized border line recognition algorithm.

In another example, in the case where a second neural network is used to identify the border line, the border line recognition algorithm is optimized by optimizing parameters of a second neural network model. In this case, taking the image containing the second obstacle captured by the image acquisition device as an input to the second neural network, and the obtained second relative position between the second obstacle and the mobile robot described above as an output from the second neural network, the second neural network model is trained so as to improve the accuracy of identifying the border line by the second neural network, obtain updated parameters of the second neural network, and obtain the optimized border line recognition algorithm.

After the server optimizes the border line recognition algorithm, the processing device of the mobile robot updates a preset border line recognition algorithm based on feedback information from the server, and identifies a border line between the second obstacle and the ground in a subsequently captured image containing the corresponding second obstacle by using the updated border line recognition algorithm. In an example, the processing device of the mobile robot updates parameters of a first neural network model preset in the mobile robot based on parameters of the first neural network model fed back by the server, and then performs identification based on the updated first neural network model. In another example, the processing device of the mobile robot updates parameters of a second neural network model preset in the mobile robot based on parameters of the second neural network model fed back by the server, and then performs identification based on the updated second neural network model.

In the navigation method of the present application, through the technical solution that sending the sample information to the server and optimizing the border line recognition algorithm at the server, and updating the border line recognition algorithm preset in the mobile robot based on the optimized border line recognition algorithm, the localization and obstacle avoidance abilities of the mobile robot can be improved.

In addition, the navigation method of the present application further includes a step of displaying a navigation route, or displaying a movement route of the mobile robot moving based on the navigation route, or displaying both, to facilitate viewing by a user. For example, in some cases, any one of the following is displayed in real time on a map presented in a terminal device based on the navigation method: a current position of the robot, a navigation route generated based on the current position and the obtained first relative position and second relative position, and a movement route of the mobile robot from the current position.

Figure 10:
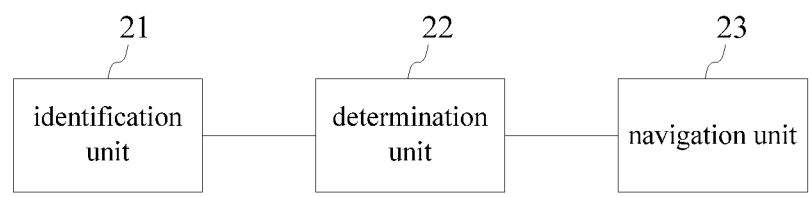
FIG. 10 shows a structural diagram of a navigation system of the present application in an embodiment.

The present application further provides a navigation system for a mobile robot with an image acquisition device. Referring to FIG. 10, which shows a structural diagram of a navigation system of the present application in an embodiment, as shown, the navigation system includes an identification unit 21, a determination unit 22 and a navigation unit 23.

The identification unit 21 is configured to identify a border line between a first obstacle and the ground from an image captured by the image acquisition device.

In some embodiments, the identification unit 21 includes a first identification module, a second identification module, and a third identification module. The first identification module is configured to identify an object image region matched with a preset object label from the image captured by the image acquisition device. In an example, the first identification module is configured to identify an object image region matched with a preset object label from the image captured by the image acquisition device by a first neural network. The second identification module is configured to determine a ground image region from the image. In an example, the second identification module is configured to extract ground feature information of the image in a preset image boundary region, and determine a ground image region in the image based on the ground feature information. In another example, the second identification module is configured to, based on the object label corresponding to the identified object image region and the position of the identified object image region in the image, determine whether the identified object image region belongs to a ground image region, and classify the determined object image region belonging to the ground image region as the ground image region in the image. In another example, the second identification module is configured to determine whether the identified object image region belongs to a ground image region based on a preset size condition. The third identification module is configured to take an intersection line between the ground image region and the object image region as the border line between the first obstacle and the ground.

In some other embodiments, the identification unit is configured to identify the border line between the first obstacle and the ground by a second neural network.

The determination unit 22 is configured to determine a first relative position between a physical position corresponding to the border line and the mobile robot based on preset physical reference information. The physical reference information comprises: a physical height between the image acquisition device and the ground, a physical parameter of the image acquisition device, and an angle between an optical axis of the image acquisition device and a horizontal plane or vertical plane. In an example, the determination unit 22 is configured to determine a first relative position between the physical position corresponding to at least one pixel point on the border line and the mobile robot based on the preset physical reference information.

The navigation unit 23 is configured to generate a navigation route based on a current position of the mobile robot and the first relative position.

In some embodiments, the navigation unit includes a first update module and a first planning module. The first update module is configured to update first obstacle information in a preset map according to the obtained first relative position. The first planning module is configured to, based on the updated map, plan a navigation route of the mobile robot within at least one unit space.

In practical applications, there are also unidentified border lines. In view of this, the identification unit 21 is further configured to acquire, from a sensing device in the mobile robot, a second relative position between a second obstacle and the mobile robot, the second obstacle is an obstacle whose border line with the ground is not identified. The navigation unit 23 is further configured to generate a navigation route based on a current position of the mobile robot, the first relative position and the second relative position.

In addition, in practical applications, missed identification may be exist in the method of identifying a border line based on an image, which leads to failure to avoid an obstacle due to inaccurate localization of the mobile robot. In view of this, a border line recognition algorithm used for identifying a border line can be updated to obtain a more accurate identification result. The border line recognition algorithm includes any of the foregoing algorithms for identifying a border line in an image, or other recognition algorithm capable of identifying a border line between an obstacle and the ground.

In view of this, the navigation unit 23 further includes a second update module and a second planning module. The second update module is configured to update first obstacle information and second obstacle information in a preset map according to the obtained first relative position and second relative position. The second planning module is configured to plan a route of the mobile robot within at least one unit space based on the updated map.

Correspondingly, the navigation system further includes a generation module and a communication module. The generation module is configured to generate sample information according to an image containing the second obstacle captured by the image acquisition device and the second relative position between the second obstacle and the mobile robot. The communication module is configured to send the sample information to a server for optimization of a border line recognition algorithm by the server. And, the identification unit 21 is further configured to update a preset border line recognition algorithm based on information feedback from the server, and identify a border line between the second obstacle and the ground in a subsequently captured image containing the corresponding second obstacle by using the updated border line recognition algorithm.

Here, each module in the navigation system of the present application operates in the same or similar manner to the corresponding step in the above-mentioned navigation method, which will not be repeated here.

Figure 11:
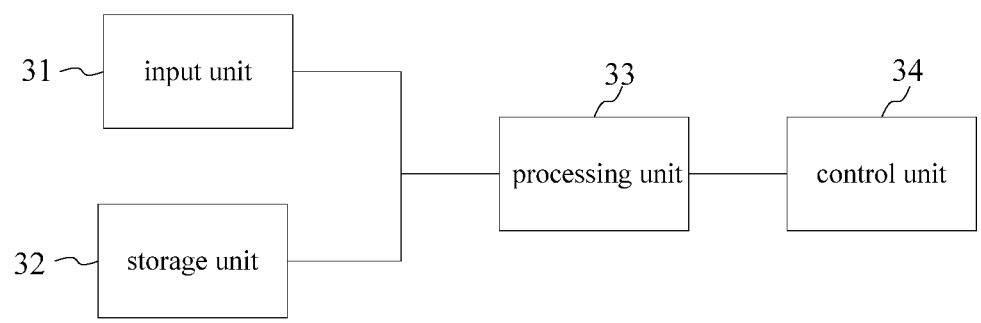
FIG. 11 shows a structural diagram of a processing system of the present application in an embodiment.

The present application further provides a processing system for a mobile robot with an image acquisition device. The processing system is, for example, a control motherboard, which is assembled on the mobile robot with an image acquisition device to control the movement of the mobile robot. Referring to FIG. 11, which shows a structural diagram of a processing system of the present application in an embodiment, as shown, the processing system includes an input unit 31, a storage unit 32, a processing unit 33 and a control unit 34.

The input unit 31 is configured to receive images captured by the image acquisition device. In some embodiments, the input unit 31 is connected with the image acquisition device of the mobile robot, so as to input the captured images to the processing system. Herein, the input unit 31 includes hardware and software which are in data connection with the image acquisition device, wherein the hardware includes but is not limited to an USB interface, an HDMI interface, etc., and the software includes but is not limited to software that reads images in the image acquisition device based on the corresponding interface protocol.

The storage unit 32 is configured to store the captured images, preset physical reference information, preset object labels, and at least one program.

The storage unit 32 includes a high speed random access memory, and also includes a non-volatile memory, for example, one or more disk storage devices, flash memory devices or other non-volatile solid state storage devices. The storage unit 32 further includes a storage controller which can control the access of other assemblies of the device such as a CPU or a peripheral interface to the storage.

The physical reference information includes but is not limited to a physical height between the image acquisition device and the ground, physical parameters of the image acquisition device, and the angle between the optic axis of the image acquisition device and the horizontal or vertical plane. Herein, those skilled in the art measure the distance between an imaging center of the image acquisition device and the ground in advance, and consider the distance as the physical height or as an initial value of the physical height and store it in the storage unit 32. The physical height can also be obtained through a calculation of the design parameters of the mobile robot in advance. The angle or an initial value of the angle between the optic axis of the image acquisition device and the horizontal or vertical plane can be obtained according to the design parameters of the mobile robot. For a mobile robot with an adjustable image acquisition device, the stored angle can be determined by adding/subtracting an adjusted deflection angle on the initial value of the angle, and the stored physical height is determined by adding/subtracting an adjusted height on the initial value of the physical height. The physical parameters of the image acquisition device include an angle of view of lens, a focal length of lens, and so on.

The object label is screened in advance based on the environment in which the mobile robot moves and is stored in the storage unit 32 of the mobile robot. The object label is used to describe the classification of objects which are possibly captured and placed in the environment or the image features of the objects in images.

In some examples, the object label is characterized by image feature of an object, and the image feature is used to identify target object in the image. For example, when a mobile robot is used in an indoor environment, the object label includes but is not limited to table, chair, sofa, flowerpot, shoes, sock, tiled object, and other image features. Wherein the tiled object includes but is not limited to ground mat or floor tile map paved on the floor, and tapestry or picture hanged on the wall.

In other examples, the object label is characterized by object classification. Herein, the programs stored in the storage unit include program of the trained neural network algorithm, and the object classification is identified from the image through executing the neural network algorithm. Still with the indoor environment as an example, the object label includes but is not limited to table, chair, sofa, flowerpot, shoes, sock, tiled object, and unknown objects. Wherein the tiled object includes but is not limited to ground mat or floor tile map paved on the floor, and tapestry or picture hanged on the wall. In addition, the unknown object indicates that one type of object which cannot be identified by the trained neural network but can be determined to be object, the unknown objects generally include objects which exist randomly indoors, for example, debris, toys, etc.

The program stored in the storage unit 32 further includes related programs which are invoked by the processing unit to perform the navigation method and which will be described below.

The processing unit 33 is operably coupled to the input unit, the storage unit and so on. In addition, the processor is also operably coupled to a power supply, and the power supply can provide electricity for various parts in a control mainboard. In view of this, the power supply can include any appropriate energy, for example, a rechargeable Li-polymer (Li-poly) battery and/or an alternating current (AC) power converter.

Figure 9:
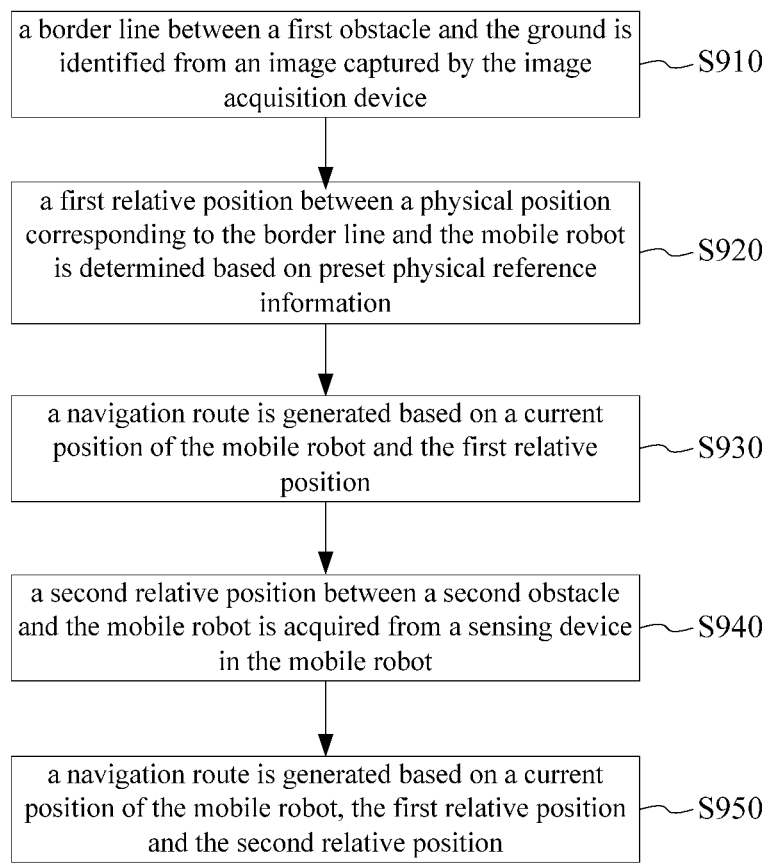
FIG. 9 shows a flow diagram of a navigation method of the present application in another embodiment.

The processing unit 33 is configured to invoke at least one program and perform any of the navigation method as described above. The processing unit 33 is in data communication with the input unit 31 and the storage unit 32. The processing unit 33 performs instructions stored in the storage unit to perform operations in the robot. The specific implementation of performing the navigation method by the processing unit is shown in FIGS. 8 to 9 and corresponding description thereof, which are not repeated here.

The control unit 34 is configured to control the movement of the mobile robot based on the navigation route generated by the processing unit 33. In some embodiments, the control unit controls the mobile robot to move along the navigation route generated by the processing unit to avoid obstacles.

The control unit 34 is a dedicated processor for converting the navigation route into control of a motor in the mobile robot. For example, the control unit 34 includes an MCU, a CPU, and the like, or the control unit 34 is integrated with at least part of hardware of the processing unit 33. For example, a processor of the control unit 34 and a processor of the processing unit 33 are a shared one, and the processor is connected with a drive motor of the mobile robot.

For example, the control unit 34 controls the moving drive motor on a vector-by-vector basis according to a plurality of vectors connected end to end in the navigation route, such that the moving drive motor moves according to an angle and length indicated by each vector. As another example, the control unit 34 controls the moving drive motor on a grid-by-grid basis according to a positional relationship between a plurality of grids in the navigation route, such that the moving drive motor moves according to each grid position.

In some embodiments, the processing system further includes an output unit configured to output the navigation route and/or a movement route of the mobile robot moving according to the navigation route for a user to view.

The output unit includes hardware and software for data connection with the processing unit 33, wherein the hardware includes but is not limited to a USB interface, an HDMI interface, and a network interface, and the software includes but is not limited to software that outputs a map based on a corresponding interface protocol, and a navigation route depicted on the map, a movement route of the mobile robot moving according to the navigation route, and the navigation route and the movement route. The output unit outputs the map provided by the processing unit, and the navigation route and/or the movement route depicted on the map to a display screen, a terminal device and the like for the user to view. For example, in some cases, any one of the following is displayed in real time on a map through the output unit: a current position of the robot, a navigation route generated based on the current position and the obtained first relative position and second relative position, and a movement route of the mobile robot from the current position.

In addition, it should be noted that through the description of the above implementations, those skilled in the art can clearly understand that part or all of the present application can be realized by means of software and in combination with necessary general-purpose hardware platforms. Based on this, the present application further provides a computer storage medium, the storage medium stores at least one program, and when the program are executed by processor, the method for controlling a movement of a mobile robot described above can be performed. In addition, the present application further provides a computer storage medium which stores at least one program, when being called, and when the program are executed by processor, the navigation method described above can be performed.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application, for example, executing each step in the control method of the mobile robot, etc. The machine readable media include but are not limited to, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory or other types of media/machine readable media which are applicable to storing machine executable instructions. Wherein the storage media can be located in the mobile robot and can also be located in a third-party server, for example, in a server providing a certain application store. Specific application stores are not limited herein, and can be a MIUI application store, a Huawei application store, and an Apple application store, etc.

The application can be used in numerous general-purpose or special-purpose calculating system environments or configurations, for example, personal computer, server computer, handheld device or portable device, tablet device, multiprocessor system, microprocessor based system, set top box, programmable consumer electronic device, network PC, small-size computer, large-scale computer, and a distributed computing environment containing any of the above system or device.

The present application can be described in the general context of the computer executable instructions executed by the computer, such as a program module. Generally, the program module includes routines, programs, objects, components, data structures and the like which execute particular tasks or realize particular abstract data types. The present application can also be practiced in the distributed computing environments. In these distributed computing environments, tasks are executed by remote processing devices which are connected via a communication network. In the distributed computing environments, the program module can be located in a local and remote computer storage medium including a storage device.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for controlling a movement of a mobile robot, wherein, the mobile robot is provided with a monocular camera device, and the method comprises the following steps:

identifying a border line between a first obstacle and a ground from an image captured by the monocular camera device, comprising any one of the following:

identifying an object image region from the image captured by the monocular camera device, determining a ground image region from the image, and taking an intersection line between the ground image region and the object image region as the border line between the first obstacle and the ground;

identifying the border line between the first obstacle and the ground in the image based on the captured image by a trained second neural network;

determining a first relative position between a physical position corresponding to the border line and the mobile robot based on preset physical reference information;

wherein, the physical reference information comprises: a physical height between the monocular camera device and the ground, a physical parameter of the monocular camera device, and an angle between an optical axis of the monocular camera device and a horizontal plane or vertical plane; and controlling the movement of the mobile robot based on the first relative position.

2. The method for controlling a movement of a mobile robot of claim 1, wherein, the step of identifying an object image region from the image captured by the monocular camera device comprises:

identifying an object image region matched with a preset object label from the image captured by the monocular camera device.

3. The method for controlling a movement of a mobile robot of claim 2, wherein the step of identifying an object image region matched with a preset object label from the image captured by the monocular camera device comprises: identifying the object image region matched with the preset object label from the captured image by a first neural network.

4. The method for controlling a movement of a mobile robot of claim 2, wherein the step of determining a ground image region from the image comprises: extracting ground feature information of the image in a preset image boundary region, and determining the ground image region in the image based on the ground feature information.

5. The method for controlling a movement of a mobile robot of claim 2, wherein the step of determining a ground image region from the image comprises: determining whether the identified object image region belongs to the ground image region based on an object label corresponding to the identified object image region and a position of the identified object image region in the image, and classifying the determined object image region belonging to the ground image region as the ground image region in the image.

6. The method for controlling a movement of a mobile robot of claim 5, wherein the step of determining a ground image region from the image comprises: determining whether the identified object image region belongs to the ground image region based on a preset size condition.

7. The method for controlling a movement of a mobile robot of claim 1, wherein the step of determining a first relative position between a physical position corresponding to the border line and the mobile robot based on preset physical reference information comprises: determining the first relative position between a physical position corresponding to at least one pixel point on the border line and the mobile robot based on the preset physical reference information.

8. The method for controlling a movement of a mobile robot of claim 1, wherein the step of controlling the movement of the mobile robot based on the first relative position comprises:
updating first obstacle information in a preset map according to the obtained first relative position; and
planning a route of the mobile robot within at least one unit space based on the updated map, and controlling the movement of the mobile robot based on the planned route.

9. The method for controlling a movement of a mobile robot of claim 1, further comprising the following steps:
acquiring, from a sensing device in the mobile robot, a second relative position between a second obstacle and the mobile robot, the second obstacle is an obstacle whose border line with the ground is not identified; and
controlling the movement of the mobile robot based on the first relative position and the second relative position.

10. The method for controlling a movement of a mobile robot of claim 9, wherein the step of controlling the movement of the mobile robot based on the first relative position and the second relative position comprises:
updating first obstacle information and second obstacle information in a preset map according to the first relative position and the second relative position; and
planning a route of the mobile robot within at least one unit space based on the updated map, and controlling the movement of the mobile robot based on the planned route.

11. The method for controlling a movement of a mobile robot of claim 9, further comprising the following steps:
generating sample information according to an image containing the second obstacle captured by the second relative position between the second obstacle and the mobile robot; and
sending the sample information to a server for optimization of a border line recognition algorithm.

12. The method for controlling a movement of a mobile robot of claim 11, further comprising a step of updating a preset border line recognition algorithm based on feedback information from the server, and identifying a border line between the second obstacle and the ground in a subsequently captured image containing a corresponding second obstacle based on the updated border line recognition algorithm.

13. A mobile robot, comprising:
a monocular camera device, configured to capture images during movement of the mobile robot;
a movement device, configured to drive, in a controlled manner, the entire mobile robot to move;
a storage device, configured to store the captured images, preset physical reference information, preset object labels, and at least one program; and
a processing device, configured to invoke the at least one program and perform the following steps:
identifying a border line between a first obstacle and a ground from an image captured by the monocular camera device, comprising any one of the following:
identifying an object image region from the image captured by the monocular camera device, determining a ground image region from the image, and taking an intersection line between the ground image region and the object image region as the border line between the first obstacle and the ground;
identifying the border line between the first obstacle and the ground in the image based on the captured image by a trained second neural network;
determining a first relative position between a physical position corresponding to the border line and the mobile robot based on preset physical reference information; wherein, the physical reference information comprises: a physical height between the monocular camera device and the ground, a physical parameter of the monocular camera device, and an angle between an optical axis of the monocular camera device and a horizontal plane or vertical plane; and
controlling the movement of the mobile robot based on the first relative position.

14. The mobile robot of claim 13, wherein, the monocular camera device is provided on a housing of the mobile robot based on the physical reference information.

15. The mobile robot of claim 13, wherein the mobile robot is a cleaning robot.

16. A navigation method for a mobile robot, wherein, the mobile robot is provided with a monocular camera device, and the navigation method comprises the following steps:
identifying a border line between a first obstacle and a ground from an image captured by the monocular camera device, comprising any one of the following:
identifying an object image region from the image captured by the monocular camera device, determining a ground image region from the image, and taking an intersection line between the ground image region and the object image region as the border line between the first obstacle and the ground;
identifying the border line between the first obstacle and the ground in the image based on the captured image by a trained second neural network;
determining a first relative position between a physical position corresponding to the border line and the mobile robot based on preset physical reference information; wherein, the physical reference information comprises: a physical height between the monocular camera device and the ground, a physical parameter of the monocular camera device, and an angle between an optical axis of the monocular camera device and a horizontal plane or vertical plane; and
generating a navigation route based on a current position of the mobile robot and the first relative position.

\* \* \* \* \*